(12) United States Patent
Feng (10) Patent No.: US 10,582,436 B2
(45) Date of Patent: Mar. 3, 2020

(54) VOICE SERVICE PROCESSING METHOD AND BASE STATION

(71) Applicant: HUAWEI TECHNOLOGIES CO., LTD., Shenzhen, Guangdong (CN)

(72) Inventor: Huijuan Feng, Chengdu (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/168,526

(22) Filed: Oct. 23, 2018

(65) Prior Publication Data

US 2019/0059034 A1 Feb. 21, 2019

Related U.S. Application Data

(63) Continuation of application No. PCT/CN2016/080815, filed on Apr. 29, 2016.

(51) Int. Cl.
*H04W 28/04* (2009.01)
*H04W 36/30* (2009.01)
*H04W 36/00* (2009.01)
*H04W 76/27* (2018.01)
*H04L 1/00* (2006.01)
*H04W 36/06* (2009.01)
*H04W 36/38* (2009.01)
*H04W 80/02* (2009.01)

(52) U.S. Cl.
CPC ........... *H04W 36/30* (2013.01); *H04L 1/0003* (2013.01); *H04W 36/0022* (2013.01); *H04W 36/06* (2013.01); *H04W 36/38* (2013.01); *H04W 76/27* (2018.02); *H04W 80/02* (2013.01)

(58) Field of Classification Search
CPC .. H04W 36/30; H04W 28/04; H04W 36/0022
See application file for complete search history.

(56) References Cited

U.S. PATENT DOCUMENTS 8,555,343 B2 10/2013 Yang et al.
8,660,026 B2 2/2014 Yang et al.
9,253,704 B1 2/2016 Sarkar et al.
(Continued)

FOREIGN PATENT DOCUMENTS

CN 103648120 A 3/2014
WO 2014169716 A1 10/2014
WO WO-2016060430 A1 * 4/2016 ........... G10L 19/005

*Primary Examiner* — Myron Wyche
(74) *Attorney, Agent, or Firm* — Womble Bond Dickinson (US) LLP (57) ABSTRACT

A voice service processing method is provided. The method includes the following steps: If UE has a connection whose QCI is 1, and a total quantity of VoLTE data packets of the UE that are received by a PDCP layer of a base station is less than a first threshold in a detection period, the base station obtains the related parameters. The base station sends an intra-cell handover command to the UE if the SINR is greater than a first preset value, the MCS is greater than a second preset value, the packet error rate of the VoLTE data packet of the UE that is received by the MAC layer of the base station is less than a third preset value, and the total quantity of VoLTE data packets of the UE that are received by the RLC layer of the base station is greater than a fourth preset value.

9 Claims, 5 Drawing Sheets (56) References Cited

U.S. PATENT DOCUMENTS

| | | | |
|---|---|---|---|
| 2012/0155298 A1* | 6/2012 | Yang | H04W 24/08 370/252 |
| 2014/0200001 A1 | 7/2014 | Song et al. | |
| 2015/0131619 A1* | 5/2015 | Zhu | H04W 36/0022 370/332 |
| 2015/0282083 A1* | 10/2015 | Jeong | H04W 52/0216 370/311 |
| 2016/0007240 A1* | 1/2016 | Belghoul | H04W 76/27 370/331 |
| 2016/0286438 A1* | 9/2016 | Weingertner | H04W 36/0022 |
| 2016/0344572 A1* | 11/2016 | Brust | H04L 12/66 |

* cited by examiner

VOICE SERVICE PROCESSING METHOD AND BASE STATION

CROSS-REFERENCE TO RELATED APPLICATIONS

This application is a continuation of International Application No. PCT/CN2016/080815, filed on Apr. 29, 2016, the disclosure of which is hereby incorporated by reference in its entirety.

TECHNICAL FIELD

The present invention relates to the field of voice communications technologies, and in particular, to a voice service processing method and a base station.

BACKGROUND

Long Term Evolution (LTE) is defined as a new-generation wireless communications standard. An LTE network is a pure packet switched system, and does not support a conventional circuit switched service. Therefore, LTE can provide a voice service only by using an Internet Protocol (IP) voice. This undoubtedly brings about many new challenges. A user expects that voice quality in the LTE network can be as good as voice quality in a circuit switched network. However, in a voice communication scenario, a problem of one-way audio usually exists. The one-way audio means that one party of a call cannot hear a voice of the other party of the call. However, the one-way audio is a systematic problem, and relates to a core network element, a transmission network element, a wireless network element, a user terminal, and the like. For example, wireless signal coverage is relatively poor, a user terminal cannot synchronize with a serving cell due to a software/hardware problem of the user terminal, or a communication mechanism of a base station in a core network has a problem. Because a relatively large quantity of network elements are related, the one-way audio is more difficult to be resolved. Currently, finding of the one-way audio mainly depends on a customer complaint received after the problem of the one-way audio occurs. However, once the complaint is received, the one-way audio actually has existed for several hours or even more than one day, while a maintenance engineer cannot know in advance, and can only passively wait for the complaint. After receiving the complaint, the maintenance engineer can reproduce the one-way audio only by using a large quantity of manual dialing tests or the like. However, a reproducing probability is extremely low. This reduces efficiency of resolving the problem of the one-way audio, and affects quality of voice communication of the user.

SUMMARY

Embodiments of the present invention provide a voice service processing method and a base station, to resolve a problem of one-way audio in time, thereby improving quality of voice communication of a user.

According to a first aspect, an embodiment of the present invention provides a voice service processing method, including: if a user terminal has a connection whose QCI is 1, and a total quantity of VoLTE data packets of the user terminal that are received by a PDCP layer of the base station is less than a first threshold in a detection period, obtaining, by the base station, a signal to interference plus noise ratio SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period; and sending, by the base station, an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value. If the user terminal has the connection whose QCI is 1, but the quantity of VoLTE data packets of the user terminal that are received by the PDCP layer of the base station is relatively small in the detection period, it indicates that the user terminal has a problem of one-way audio in the detection period. Further, the base station sends the intra-cell handover command to the user terminal if the base station determines, based on the SINR and the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period, that a wireless environment of a cell in which the user terminal is located currently is relatively good. In this way, the user terminal can continue to perform communication in the cell by re-configuring a radio bearer, so that the PDCP layer of the base station can receive a relatively large quantity of VoLTE data packets of the user terminal. Therefore, in this way, the problem of the one-way audio can be resolved in time, thereby improving quality of voice communication of a user.

With reference to the first aspect, in a first implementation of the first aspect, the base station may further send a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value. If the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value, it indicates that a wireless environment in which the user terminal is located currently may be relatively poor. Therefore, the base station may send the RRC connection release command to the user terminal, and the user terminal re-establishes an RRC connection by using a frequency currently used by the user terminal, or re-establishes an RRC connection by using another frequency in the RRC connection release command, to restore the one-way audio caused by the relatively poor wireless environment.

According to a second aspect, an embodiment of the present invention provides another voice service processing method, including: if a user terminal has a connection whose QCI is 1, a total quantity of VoLTE data packets of the user terminal that are received by a PDCP layer of the base station is greater than a first threshold, and a packet error rate of the VoLTE data packets of the user terminal that are received by the PDCP layer of the base station is greater than a second threshold in a detection period, obtaining, by the base station, an SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period; and sending, by the base station, an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value. If the user terminal has the connection whose QCI is 1, the quantity of VoLTE data packets of the user terminal that are received by the PDCP layer of the base station is relatively large, but the packet error rate is relatively high in the detection period, it indicates that the user terminal has a problem of one-way audio in the detection period. Further, the base station sends the intra-cell handover command to the user terminal if the base station determines, based on the SINR and the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period, that a wireless environment of a cell in which the user terminal is located currently is relatively good. In this way, the user terminal can continue to perform communication in the cell by re-configuring a radio bearer, so that the PDCP layer of the base station can receive a relatively large quantity of VoLTE data packets of the user terminal. Therefore, in this way, the problem of the one-way audio of the user terminal can be resolved in time, thereby improving quality of voice communication of a user.

With reference to the second aspect, in a first implementation of the second aspect, the base station may further send a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value. If the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value, it indicates that a wireless environment in which the user terminal is located currently may be relatively poor. Therefore, the base station may send the RRC connection release command to the user terminal, and the user terminal re-establishes an RRC connection by using a frequency currently used by the user terminal, or re-establishes an RRC connection by using another frequency in the RRC connection release command, to restore the one-way audio caused by the relatively poor wireless environment.

With reference to the second aspect or the first implementation of the second aspect, in a second implementation of the second aspect, when robust header compression ROHC is used, a step of obtaining the packet error rate of the VoLTE data packets of the user terminal that are received by the PDCP layer of the base station includes: if a version number included in the VoLTE data packets of the user terminal that are received by the PDCP layer of the base station is neither IPv4 nor IPv6, adding, by the base station, 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

With reference to the second aspect or the first implementation of the second aspect, in a third implementation of the second aspect, when ROHC is not used, a step of obtaining the packet error rate of the VoLTE data packets of the user terminal that are received by the PDCP layer of the base station includes: if there is a cyclic redundancy check CRC error in the VoLTE data packets of the user terminal that are received by the PDCP layer of the base station, adding, by the base station, 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

According to a third aspect, an embodiment of the present invention provides a base station, and the base station includes an obtaining unit and a first sending unit. The obtaining unit is configured to: if a user terminal has a connection whose QCI is 1, and a total quantity of VoLTE data packets of the user terminal that are received by a PDCP layer of the base station is less than a first threshold in a detection period, obtain an SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period. The first sending unit is configured to send an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

According to a fourth aspect, an embodiment of the present invention provides another base station, and the base station includes an obtaining unit and a first sending unit. The obtaining unit is configured to: if a user terminal has a connection whose QCI is 1, a total quantity of VoLTE data packets of the user terminal that are received by a PDCP layer of the base station is greater than a first threshold, and a packet error rate of the VoLTE data packets of the user terminal that are received by the PDCP layer of the base station is greater than a second threshold in a detection period, obtain an SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period. The first sending unit is configured to send an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

The base stations provided in the third aspect and the fourth aspect have functions of implementing actual base station behavior in respective corresponding methods. The functions may be implemented by using hardware, or may be implemented by executing corresponding software by hardware. The hardware or the software includes one or more modules corresponding to the functions.

In a possible design, a structure of a base station includes a processor and a transceiver. Optionally, the base station may further include a memory. The memory is configured to store application program code used to support the base station in performing a corresponding method. The processor is configured to execute an application program stored in the memory.

According to a fifth aspect, an embodiment of the present invention provides a computer storage medium, configured to store a computer software instruction used by the base station in the third aspect or the fourth aspect. The computer software instruction includes a program that is used to execute the third aspect or the fourth aspect and that is designed for the base station.

In comparison with that in the prior art, in the solutions provided in the embodiments of the present invention, when the base station determines, through detection, that the user terminal has the problem of the one-way audio in the detection period, the base station sends the intra-cell handover command to the user terminal if the base station determines, based on the SINR and the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period, that the wireless environment of the cell in which the user terminal is located currently is relatively good. In this way, the user terminal can continue to perform communication in the cell by re-configuring the radio bearer, so that the PDCP layer of the base station can receive a relatively large quantity of VoLTE data packets of the user terminal. Therefore, in this way, the problem of the one-way audio of the user terminal can be resolved in time, thereby improving quality of voice communication of a user.

In the present invention, names of the base station and the user terminal constitute no limitation on the devices. In actual implementation, these devices may appear with other names. Provided that a function of each device is similar to that in the present invention, the function falls within the protection scope of the claims of the present invention and their equivalent technologies.

These aspects or other aspects of the present invention are more concise and comprehensible in the description of the following embodiments.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make persons skilled in the art understand the technical solutions in the present invention better, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Network architectures and service scenarios that are described in the embodiments of the present invention are used to describe the technical solutions in the embodiments of the present invention more clearly, but are not intended to limit the technical solutions provided in the embodiments of the present invention. Persons of ordinary skill in the art may learn that, with evolution of the network architectures and emergence of a new service scenario, the technical solutions provided in the embodiments of the present invention are also applicable to a similar technical problem. It should be noted that the terms used in the embodiments of the present invention are merely for the purpose of illustrating specific embodiments, and are not intended to limit the present invention. The terms "a", "said" and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. In addition, in the specification, claims, and accompanying drawings of the present invention, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 1:
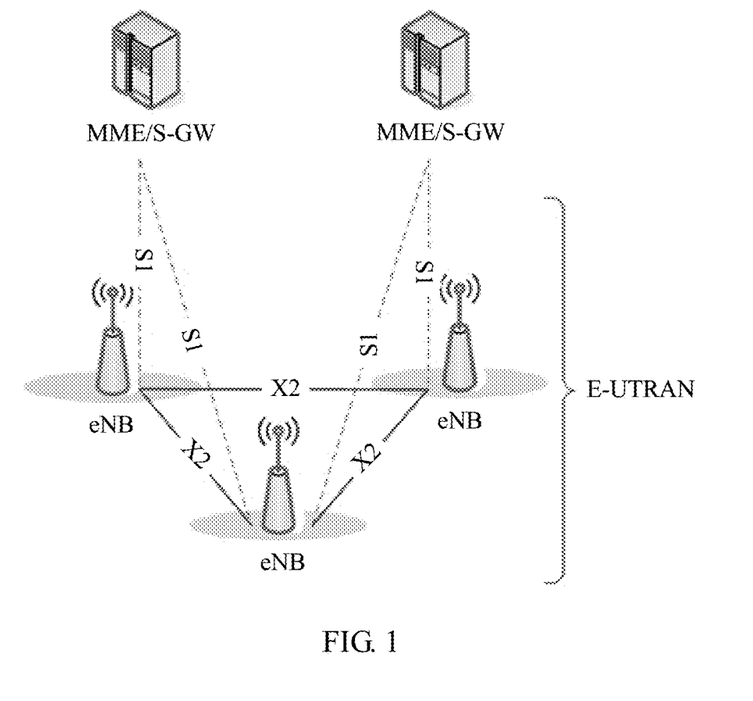
FIG. 1 is a diagram of a possible network architecture according to an embodiment of the present invention.

To facilitate understanding of the present invention, the following first describes a diagram of a possible network architecture applicable to the embodiments of the present invention. Referring to FIG. 1, FIG. 1 is a diagram of a possible network architecture according to an embodiment of the present invention. The diagram of the network architecture shown in FIG. 1 is a diagram of a Long Term Evolution (LTE) network architecture. An LTE access network is referred to as an evolved universal terrestrial radio access network (E-UTRAN). An E-UTRAN structure includes several eNodeBs. The eNodeBs use IP for transmission at a bottom layer, and are logically connected to each other by using an X2 interface. Each eNodeB is connected to a mobility management entity (MME) and a serving gateway (S-GW) in an evolved packet core (EPC) network by using S1 interfaces. Specifically, the eNodeB is connected to the MME by using an S1-MME interface, and is connected to the S-GW by using an S1-U interface. The S1-MME interface and the S1-U interface may be respectively considered as a control plane of an S1 interface and a user plane of an S1 interface. A plane for transmitting service and application data is referred to as a user plane, and the user plane carries application data of a user. For example, when a user equipment (UE) such as a mobile phone is used for surfing the Internet, content on a web page, chat content, and the like are seen. The content is transmitted by using the user plane. A plane for transmitting signaling information is referred to as a control plane, and the control plane carries interaction control information of the user and a network. For example, establishment, maintenance, and release of a link between the user and the network during Internet surfing are completed by using the control plane. A user plane protocol stack between an eNodeB and UE includes the Packet Data Convergence Protocol (PDCP), Radio Link Control (RLC), Media Access Control (MAC), and a physical layer (PHY). A control plane protocol stack between the eNodeB and the UE includes radio resource control (RRC), PDCP, RLC, MAC, and a PHY.

Further, an RRC layer is responsible for establishing a radio bearer and configuring all bottom layers that are between the eNodeB and the UE and that are controlled by RRC signaling. The bottom layers include PDCP, RLC, MAC, and a PHY. A PDCP layer is responsible for performing header compression to reduce bit traffic that is necessarily transmitted by a wireless interface. The PDCP layer is further responsible for performing an encryption function and an integrity protection function on transmitted data. At a receive end, the PDCP protocol is responsible for performing a decryption function and a decompression function. An RLC layer is responsible for segmentation, connection and retransmission processing, and sequential transmission of high-layer data. The RLC layer provides a service for the PDCP layer in a radio bearer manner. A MAC layer is responsible for hybrid automatic repeat request (HARQ) processing and uplink-downlink scheduling. The MAC layer provides a service for the RLC layer in a logical channel manner. A PHY layer is responsible for coding and decoding processing, modulation and demodulation, multi-antenna mapping, and another telecommunication physical layer function. The physical layer provides a service for the MAC layer in a transmission channel manner.

In actual application, an LTE network can provide a voice service, a video service, a data service, and the like for a user terminal accessing the LTE network, for example, a voice over LTE (VoLTE) data packet. Further, in the voice over LTE, a case of one-way audio may occur. In the prior art, finding of the one-way audio mainly depends on a customer complaint received after the problem of the one-way audio occurs. However, once the complaint is received, the one-way audio actually has existed for several hours or even more than one day, while a maintenance engineer cannot know in advance, and can only passively wait for the complaint. After receiving the complaint, the maintenance engineer can reproduce the one-way audio only by using a large quantity of manual dialing tests or the like. However, a reproducing probability is extremely low. This reduces efficiency of resolving the problem of the one-way audio. In the embodiments of the present invention, if it is finally determined, in a detection period by using a quality of service class identifier (QCI) and a total quantity of VoLTE data packets of a user terminal that are received by a PDCP layer of a base station, that the user terminal encounters one-way audio, the base station may send an intra-cell handover command to the user terminal when a specific condition is met. In this way, the user terminal can resolve the problem of the one-way audio in time by using the intra-cell handover command, thereby improving quality of voice communication of a user.

In the embodiments of the present invention, a base station may be an eNodeB in the possible network architecture shown in FIG. 1. A user terminal related to the embodiments of the present invention may include but is not limited to a terminal and a mobile terminal. The user terminal may communicate with one or more core networks by using a radio access network. For example, UE may be various types of terminal devices such as a mobile phone, a tablet computer, a personal digital assistant (PDA), a mobile Internet device (MID), and an intelligent wearable device (such as a smartwatch or a smart band).

Figure 2:
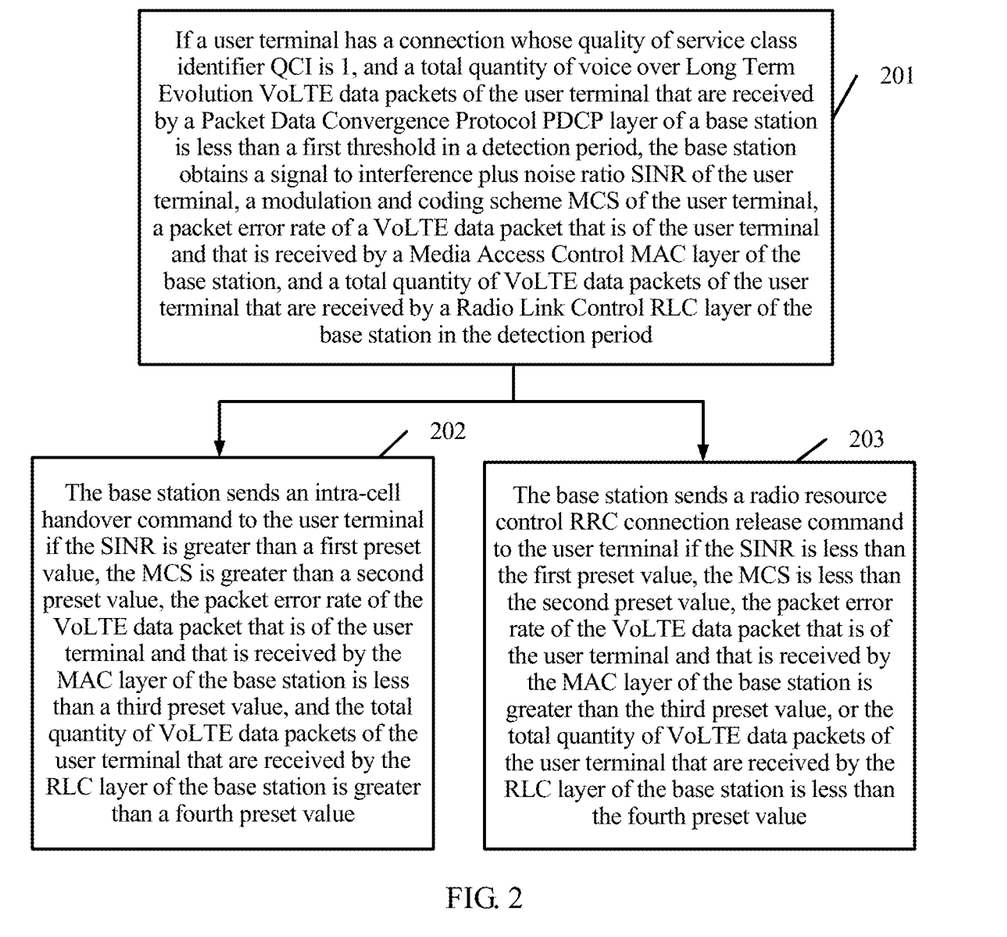
FIG. 2 is a schematic flowchart of a voice service processing method according to an embodiment of the present invention.

Referring to FIG. 2, FIG. 2 is a schematic flowchart of a voice service processing method according to an embodiment of the present invention. As shown in FIG. 2, the method in this embodiment of the present invention may include the following step 201 to step 203.

201. If a user terminal has a connection whose quality of service class identifier QCI is 1, and a total quantity of voice over Long Term Evolution VoLTE data packets of the user terminal that are received by a Packet Data Convergence Protocol PDCP layer of the base station is less than a first threshold in a detection period, the base station obtains a signal to interference plus noise ratio SINR of the user terminal, a modulation and coding scheme MCS of the user terminal, a packet error rate of a VoLTE data packet that is of the user terminal and that is received by a Media Access Control MAC layer of the base station, and a total quantity of VoLTE data packets of the user terminal that are received by a Radio Link Control RLC layer of the base station in the detection period.

Specifically, if the user terminal has the connection whose QCI is 1, and the total quantity of VoLTE data packets of the user terminal that are received by the PDCP layer of the base station is less than the first threshold in the detection period, the base station obtains the signal to interference plus noise ratio (SINR) of the user terminal, the modulation and coding scheme (MCS) of the user terminal, the packet error rate of the VoLTE data packet that is of the user terminal and that is received by the MAC layer of the base station, and the total quantity of VoLTE data packets of the user terminal that are received by the RLC layer of the base station in the detection period.

It may be understood that, the connection whose QCI is 1 indicates that a current priority of a voice service of the user terminal is the highest. The total quantity of VoLTE data packets of the user terminal that are received by the PDCP layer of the base station is less than the first threshold. If both the two conditions are met, it indicates that the quantity of VoLTE data packets of the user terminal that are received by the PDCP layer of the base station is still relatively small when the priority of the voice service of the user terminal is the highest. In this case, the base station considers that the user terminal encounters one-way audio in the detection period. Optionally, the first threshold is set by the base station in a user-defined manner. For example, the first threshold is 0 or 10. Optionally, the detection period is set by the base station in a user-defined manner. Specific values of the first threshold and the detection period are not limited in this embodiment of the present invention.

Further, in the SINR of the user terminal, the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period that are obtained by the base station, the SINR of the user terminal is used to indicate a ratio of power of a voice signal to power of an interference signal and a noise signal in a process of performing, by the user terminal, a voice service in the detection period. It may be understood that, a larger SINR of the user terminal indicates less interference and lower noise in a current wireless environment. Because the MCS may be corresponding to a plurality of modulation schemes, and one modulation scheme is corresponding to one physical transmission rate, the MCS of the user terminal may be used to indicate a physical transmission rate of the user terminal in the detection period. Optionally, the MCS may be presented in a manner of an index value. It may be understood that, a higher physical transmission rate determined by using the MCS of the user terminal indicates a better current wireless environment. The packet error rate of the VoLTE data packet that is of the user terminal and that is received by the MAC layer of the base station is a ratio of a quantity of error packets determined by the MAC layer of the base station based on a VoLTE data packet check mechanism to a total quantity of VoLTE data packets. A lower packet error rate of the VoLTE data packet that is of the user terminal and that is received by the MAC layer of the base station indicates a better current wireless environment. The total quantity of VoLTE data packets of the user terminal that are received by the RLC layer of the base station is a total quantity of VoLTE data packets transmitted by the MAC layer of the base station to the RLC layer of the base station after the MAC layer of the base station checks the VoLTE data packets. It may be understood that, after checking the received VoLTE data packets of the user terminal, the MAC layer of the base station transmits, to the RLC layer of the base station, a VoLTE data packet that is checked to be correct. Therefore, a total quantity of VoLTE data packets at the MAC layer of the base station is not less than the total quantity of VoLTE data packets at the RLC layer of the base station.

It should be noted that, VoLTE data packets of the user terminal that are received by various protocol stacks of the base station are different, because each protocol stack needs to perform corresponding processing before the protocol stack sends a VoLTE data packet to a next protocol layer.

202. The base station sends an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

Specifically, if the SINR is greater than the first preset value, the MCS is greater than the second preset value, the packet error rate of the VoLTE data packet that is of the user terminal and that is received by the MAC layer of the base station is less than the third preset value, and the total quantity of VoLTE data packets of the user terminal that are received by the RLC layer of the base station is greater than the fourth preset value, it can be learned from each condition that, a wireless environment of a current cell is relatively good. However, because the user terminal has the connection whose QCI is 1, and the total quantity of VoLTE data packets of the user terminal that are received by the PDCP layer of the base station is less than the first threshold in the detection period, a reason why the user terminal encounters the one-way audio this time may be that a PDCP entity becomes faulty. In addition, because each RB is connected to one PDCP entity, and each PDCP entity is corresponding to one RLC entity, the PDCP entity and the RLC entity can be re-configured by re-configuring the RB, thereby restoring the one-way audio caused by a failure of the PDCP entity. Optionally, the intra-cell handover command is used to instruct the user terminal to re-configure a radio bearer. Therefore, the base station may send the intra-cell handover command to the user terminal, so that the user terminal re-configures the radio bearer based on the intra-cell handover command.

203. The base station sends a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value.

Specifically, the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value. An "or" relationship among all the conditions is used to indicate that the RRC connection release command may be sent to the user terminal, provided that one of the foregoing four conditions is met. It may be understood that, if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value, it indicates that a wireless environment in which the user terminal is located currently may be relatively poor. Therefore, the base station may send the RRC connection release command to the user terminal. Correspondingly, after receiving the RRC connection release command, the user terminal releases a current RRC connection, and re-establishes an RRC connection by using a frequency currently used by the user terminal. Optionally, the RRC connection release command may carry another frequency. The another frequency is a frequency that is different from the frequency used by the user terminal before the user terminal receives the RRC connection release command. In this way, after the user terminal receives the RRC connection release command, the user terminal may search for a corresponding cell by using the another frequency, to restore the one-way audio caused by the relatively poor wireless environment.

It should be noted that, optionally, the base station may perform the obtaining action in step 201 when the user terminal has the connection whose QCI is 1, and the total quantity of VoLTE data packets of the user terminal that are received by the PDCP layer of the base station is equal to the first threshold. Optionally, any one of the following four cases may be added to step 202 or step 203: a case in which the SINR is equal to the first preset value, a case in which the MCS is equal to the second preset value, a case in which the packet error rate of the VoLTE data packet that is of the user terminal and that is received by the MAC layer of the base station is equal to the third preset value, and a case in which the total quantity of VoLTE data packets of the user terminal that are received by the RLC layer of the base station is equal to the fourth preset value. This is not limited in this embodiment of the present invention.

It should be noted that, in this embodiment of the present invention, step 201 and step 202 are necessary steps, while step 203 may be an optional step. It may be understood that, step 202 and step 203 describe two cases that cannot exist simultaneously. Therefore, in a possible embodiment, step 201 and step 203 may be necessary steps, while step 202 is an optional step. For a specific execution process of each step in the possible embodiment, refer to the embodiment shown in FIG. 2. Details are not described herein again.

In this embodiment of the present invention, if the user terminal has the connection whose QCI is 1, but the quantity of VoLTE data packets of the user terminal that are received by the PDCP layer of the base station is relatively small in the detection period, it indicates that the user terminal has a problem of the one-way audio in the detection period. Further, the base station sends the intra-cell handover command to the user terminal if the base station determines, based on the SINR and the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period, that the wireless environment of the cell in which the user terminal is located currently is relatively good. In this way, the user terminal can continue to perform communication in the cell by re-configuring the radio bearer, so that the PDCP layer of the base station can receive a relatively large quantity of VoLTE data packets of the user terminal. Therefore, in this way, the problem of the one-way audio of the user terminal can be resolved in time, thereby improving quality of voice communication of a user.

Figure 3:
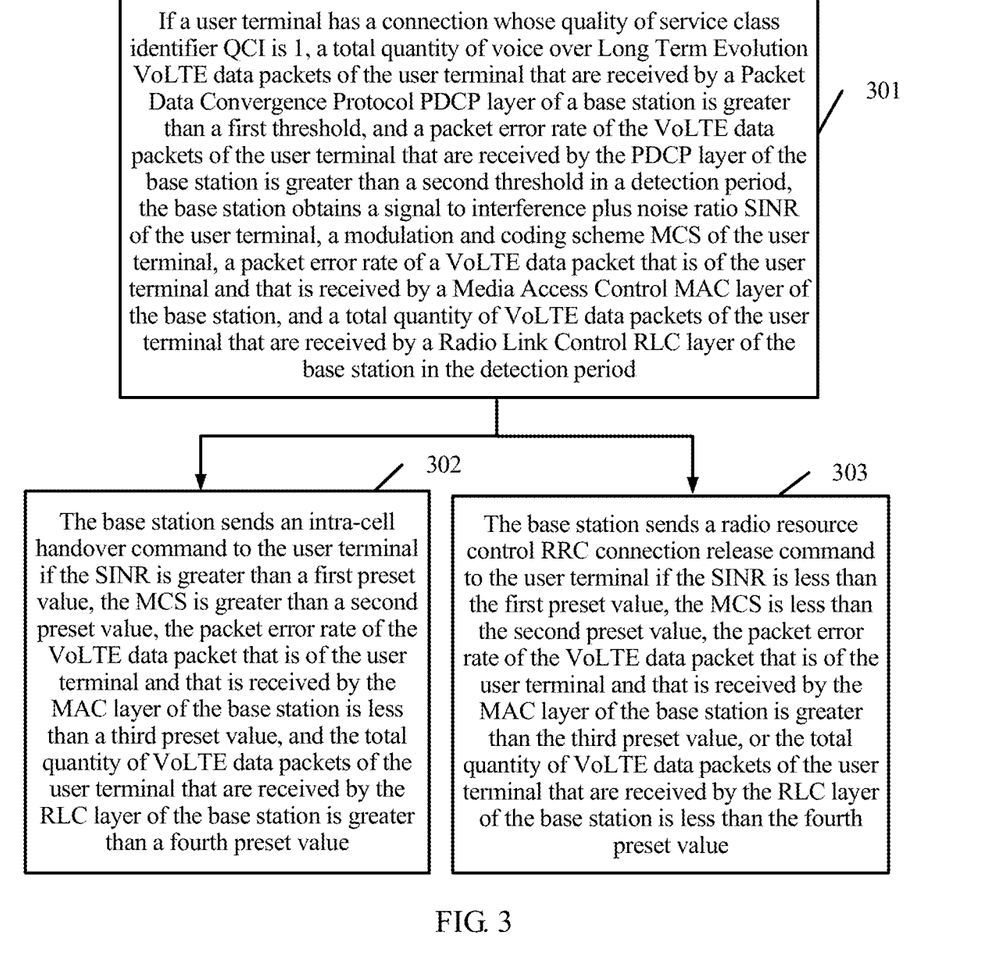
FIG. 3 is a schematic flowchart of another voice service processing method according to an embodiment of the present invention.

Referring to FIG. 3, FIG. 3 is a schematic flowchart of another voice service processing method according to an embodiment of the present invention. As shown in FIG. 3, the method in this embodiment of the present invention may include the following step 301 to step 303.

301. If a user terminal has a connection whose quality of service class identifier QCI is 1, a total quantity of voice over Long Term Evolution VoLTE data packets of the user terminal that are received by a Packet Data Convergence Protocol PDCP layer of the base station is greater than a first threshold, and a packet error rate of the VoLTE data packets of the user terminal that are received by the PDCP layer of the base station is greater than a second threshold in a detection period, the base station obtains a signal to interference plus noise ratio SINR of the user terminal, a modulation and coding scheme MCS of the user terminal, a packet error rate of a VoLTE data packet that is of the user terminal and that is received by a Media Access Control MAC layer of the base station, and a total quantity of VoLTE data packets of the user terminal that are received by a Radio Link Control RLC layer of the base station in the detection period.

Specifically, if the user terminal has the connection whose QCI is 1, the total quantity of VoLTE data packets of the user terminal that are received by the PDCP layer of the base station is greater than the first threshold, and the packet error rate of the VoLTE data packets of the user terminal that are received by the PDCP layer of the base station is greater than the second threshold in the detection period, the base station obtains the SINR of the user terminal, the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period. It may be understood that, the connection whose QCI is 1 indicates that a current priority of a voice service of the user terminal is the highest. The total quantity of VoLTE data packets of the user terminal that are received by the PDCP layer of the base station is greater than the first threshold. The packet error rate of the VoLTE data packets of the user terminal that are received by the PDCP layer of the base station is greater than the second threshold. If all the three conditions are met, it indicates that when the priority of the voice service of the user terminal is the highest, the quantity of VoLTE data packets of the user terminal that are received by the PDCP layer of the base station is relatively large, but the packet error rate is relatively high. In this case, the base station considers that the user terminal encounters one-way audio in the detection period. Optionally, the first threshold and the second threshold are set by the base station in a user-defined manner. Optionally, the detection period is set by the base station in a user-defined manner. Specific values of the first threshold, the second threshold, and the detection period are not limited in this embodiment of the present invention.

Further, in a possible solution, when robust header compression (ROHC) is used, if a version number included in the VoLTE data packets of the user terminal that are received by the PDCP layer of the base station is neither IPv4 nor IPv6, the base station adds 1 to a quantity of error packets in the VoLTE data packets of the user terminal that are received by the PDCP layer, and calculates, based on the total quantity of VoLTE voice packets of the user terminal that are received by the PDCP layer and the quantity of error packets, the packet error rate of the VoLTE data packets of the user terminal that are received by the PDCP layer of the base station. In another possible solution, when ROHC is not used, if there is a CRC error in the VoLTE data packets of the user terminal that are received by the PDCP layer of the base station, the base station adds 1 to a quantity of error packets in the VoLTE data packets of the user terminal that are received by the PDCP layer, and calculates, based on the total quantity of VoLTE voice packets of the user terminal that are received by the PDCP layer and the quantity of error packets, the packet error rate of the VoLTE data packets of the user terminal that are received by the PDCP layer of the base station.

Further, in the SINR of the user terminal, the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period that are obtained by the base station, the SINR of the user terminal is used to indicate a ratio of power of a voice signal to power of an interference signal and a noise signal in a process of performing, by the user terminal, a voice service in the detection period. It may be understood that, a larger SINR of the user terminal indicates less interference and lower noise in a current wireless environment. Because the MCS may be corresponding to a plurality of modulation schemes, and one modulation scheme is corresponding to one physical transmission rate, the MCS of the user terminal may be used to indicate a physical transmission rate of the user terminal in the detection period. Optionally, the MCS may be presented in a manner of an index value. It may be understood that, a higher physical transmission rate determined by using the MCS of the user terminal indicates a better current wireless environment. The packet error rate of the VoLTE data packet that is of the user terminal and that is received by the MAC layer of the base station is a ratio of a quantity of error packets determined by the MAC layer of the base station based on a VoLTE data packet check mechanism to a total quantity of VoLTE data packets. A lower packet error rate of the VoLTE data packet that is of the user terminal and that is received by the MAC layer of the base station indicates a better current wireless environment. The total quantity of VoLTE data packets of the user terminal that are received by the RLC layer of the base station is a total quantity of VoLTE data packets transmitted by the MAC layer of the base station to the RLC layer of the base station after the MAC layer of the base station checks the VoLTE data packets. It may be understood that, after checking the received VoLTE data packets of the user terminal, the MAC layer of the base station transmits, to the RLC layer of the base station, a VoLTE data packet that is checked to be correct. Therefore, a total quantity of VoLTE data packets at the MAC layer of the base station is not less than the total quantity of VoLTE data packets at the RLC layer of the base station.

It should be noted that, VoLTE data packets of the user terminal that are received by various protocol stacks of the base station are different, because each protocol stack needs to perform corresponding processing before the protocol stack sends a VoLTE data packet to a next protocol layer.

302. The base station sends an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

Specifically, if the SINR is greater than the first preset value, the MCS is greater than the second preset value, the packet error rate of the VoLTE data packet that is of the user terminal and that is received by the MAC layer of the base station is less than the third preset value, and the total quantity of VoLTE data packets of the user terminal that are received by the RLC layer of the base station is greater than the fourth preset value, it can be learned from each condition that, a wireless environment of a current cell is relatively good. However, because the user terminal has the connection whose QCI is 1, the total quantity of VoLTE data packets of the user terminal that are received by the PDCP layer of the base station is greater than the first threshold, and the packet error rate of the VoLTE data packets of the user terminal that are received by the PDCP layer of the base station is greater than the second threshold in the detection period, a reason why the user terminal encounters the one-way audio this time may be that a PDCP entity becomes faulty. In addition, because each RB is connected to one PDCP entity, and each PDCP entity is corresponding to one RLC entity, the PDCP entity and the RLC entity can be re-configured by re-configuring the RB, thereby restoring the one-way audio caused by a failure of the PDCP entity. Optionally, the intra-cell handover command is used to instruct the user terminal to re-configure a radio bearer. Therefore, the base station may send the intra-cell handover command to the user terminal, so that the user terminal re-configures the radio bearer based on the intra-cell handover command.

303. The base station sends a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value.

Specifically, the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value. An "or" relationship among all the conditions is used to indicate that the RRC connection release command may be sent to the user terminal, provided that one of the foregoing four conditions is met. It may be understood that, if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value, it indicates that a wireless environment in which the user terminal is located currently may be relatively poor. Therefore, the base station may send the RRC connection release command to the user terminal. Correspondingly, after receiving the RRC connection release command, the user terminal releases a current RRC connection, and re-establishes an RRC connection by using a frequency currently used by the user terminal. Optionally, the RRC connection release command may carry another frequency. The another frequency is a frequency that is different from the frequency used by the user terminal before the user terminal receives the RRC connection release command. In this way, after the user terminal receives the RRC connection release command, the user terminal may search for a corresponding cell by using the another frequency, to restore the one-way audio caused by the relatively poor wireless environment.

It should be noted that, optionally, a case in which the total quantity of VoLTE data packets of the user terminal that are received by the PDCP layer of the base station is equal to the first threshold and/or a case in which the packet error rate of the VoLTE data packets of the user terminal that are received by the PDCP layer of the base station is greater than the second threshold may also be added to step 301. This is not limited in this embodiment of the present invention. Optionally, any one of the following four cases may be added to step 302 or step 303: a case in which the SINR is equal to the first preset value, a case in which the MCS is equal to the second preset value, a case in which the packet error rate of the VoLTE data packet that is of the user terminal and that is received by the MAC layer of the base station is equal to the third preset value, and a case in which the total quantity of VoLTE data packets of the user terminal that are received by the RLC layer of the base station is equal to the fourth preset value. This is not limited in this embodiment of the present invention.

It should be noted that, in this embodiment of the present invention, step 301 and step 302 are necessary steps, while step 303 may be an optional step. It may be understood that, step 302 and step 303 describe two cases that cannot exist simultaneously. Therefore, in a possible embodiment, step 301 and step 303 may be necessary steps, while step 302 is an optional step. For a specific execution process of each step in the possible embodiment, refer to the embodiment shown in FIG. 3. Details are not described herein again.

In this embodiment of the present invention, if the user terminal has the connection whose QCI is 1, the quantity of VoLTE data packets of the user terminal that are received by the PDCP layer of the base station is relatively large, but the packet error rate is relatively high in the detection period, it indicates that the user terminal has a problem of the one-way audio in the detection period. Further, the base station sends the intra-cell handover command to the user terminal if the base station determines, based on the SINR and the MCS of the user terminal, the packet error rate of the VoLTE data packet that is of the user terminal and that is received by the MAC layer of the base station, and the total quantity of VoLTE data packets of the user terminal that are received by the RLC layer of the base station in the detection period, that the wireless environment of the cell in which the user terminal is located currently is relatively good. In this way, the user terminal can continue to perform communication in the cell by re-configuring the radio bearer, so that the PDCP layer of the base station can receive a relatively large quantity of VoLTE data packets of the user terminal. Therefore, in this way, the problem of the one-way audio of the user terminal can be resolved in time, thereby improving quality of voice communication of a user.

Figure 4:
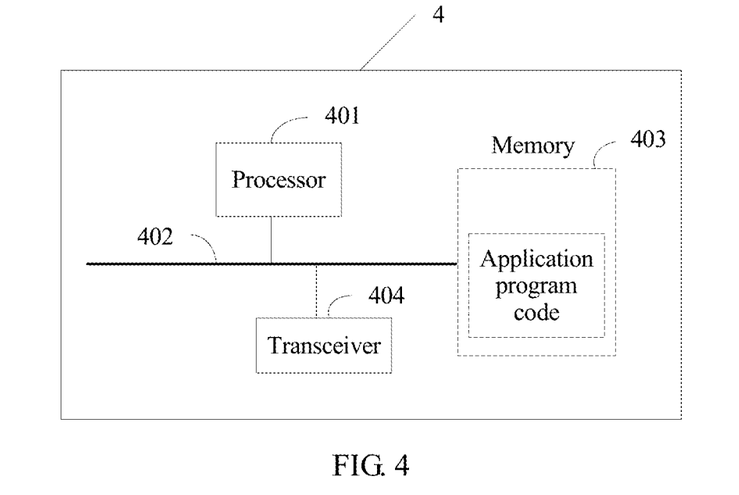
FIG. 4 is a schematic structural diagram of a computer device according to an embodiment of the present invention.

Referring to FIG. 4, the base station in FIG. 2 or FIG. 3 may be implemented by using a computer device (or a computer system) in FIG. 4. FIG. 4 is a schematic diagram of a computer device according to an embodiment of the present invention. As shown in FIG. 4, the computer device 4 includes at least one processor 401, a bus 402, and a transceiver 404. Optionally, the computer device may further include a memory 403.

The processor 401 may be a general-purpose central processing unit (CPU), a microprocessor, an application-specific integrated circuit (ASIC), or one or more integrated circuits configured to control program execution in the solution of the present invention.

The bus 402 may include a path that transmits information between the foregoing components. The bus 402 may be a Peripheral Component Interconnect (PCI) bus, an Extended Industry Standard Architecture (EISA) bus, or the like. The bus 402 may be classified into an address bus, a data bus, a control bus, and the like. For ease of representation, only one bold line is used in FIG. 4 for representation, but it does not indicate that there is only one bus or one type of bus.

The memory 403 may be a read-only memory (read-only memory, ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a disk storage medium or another disk storage device, or any other medium that can be used to carry or store expected program code in an instruction or data structure form and that can be accessed by a computer. However, this is not limited herein. The memory 403 may exist independently and is connected to the processor 401 by using the bus 402. Alternatively, the memory 403 may be integrated with the processor 401.

Optionally, the memory 403 is configured to store application program code used to execute the solutions of the present invention, and execution of the application program code is controlled by the processor 401. The processor 401 is configured to execute the application program code stored in the memory 403.

According to one aspect, the processor 401 may perform a voice service processing method provided in the present invention. For example, if a user terminal has a connection whose QCI is 1, and a total quantity of VoLTE data packets of the user terminal that are received by a PDCP layer of the base station is less than a first threshold in a detection period, the processor 401 obtains an SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period. The processor 401 sends an intra-cell handover command to the user terminal by using the transceiver 404 if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

According to another aspect, the processor 401 may perform another voice service processing method provided in the present invention. For example, if a user terminal has a connection whose QCI is 1, a total quantity of VoLTE data packets of the user terminal that are received by a PDCP layer of the base station is greater than a first threshold, and a packet error rate of the VoLTE data packets of the user terminal that are received by the PDCP layer of the base station is greater than a second threshold in a detection period, the processor 401 obtains an SINR of the user terminal, an MCS of the user terminal, a packet error rate of a VoLTE data packet that is of the user terminal and that is received by a MAC layer of the base station, and a total quantity of VoLTE data packets of the user terminal that are received by an RLC layer of the base station in the detection period. The processor 401 sends an intra-cell handover command to the user terminal by using the transceiver 404 if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

In specific implementation, in an embodiment, the computer device 4 may include a plurality of processors. Each of the processors may be a single-CPU processor, or may be a multi-CPU processor. The processor herein may be one or more devices, circuits, and/or processing cores configured to process data (for example, a computer program instruction).

Figure 5:
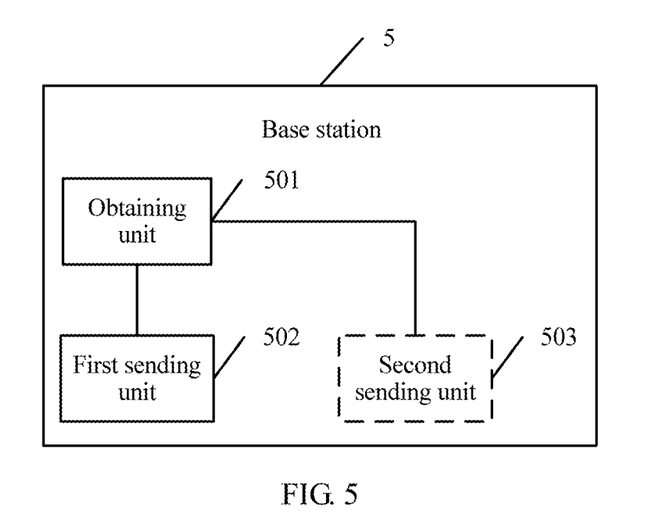
FIG. 5 is a schematic structural diagram of a base station according to an embodiment of the present invention.

Referring to FIG. 5, FIG. 5 is a schematic structural diagram of a base station according to an embodiment of the present invention. As shown in FIG. 5, the base station 5 in this embodiment of the present invention may include an obtaining unit 501 and a first sending unit 502. Optionally, the base station 5 may further include a second sending unit 503.

The obtaining unit 501 is configured to: if a user terminal has a connection whose quality of service class identifier QCI is 1, and a total quantity of voice over Long Term Evolution VoLTE data packets of the user terminal that are received by a Packet Data Convergence Protocol PDCP layer of the base station is less than a first threshold in a detection period, obtain a signal to interference plus noise ratio SINR of the user terminal, a modulation and coding scheme MCS of the user terminal, a packet error rate of a VoLTE data packet that is of the user terminal and that is received by a Media Access Control MAC layer of the base station, and a total quantity of VoLTE data packets of the user terminal that are received by a Radio Link Control RLC layer of the base station in the detection period.

The first sending unit 502 is configured to send an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

In a possible embodiment, the base station 5 may further include the second sending unit 503, and the second sending unit 503 is configured to send a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value.

It should be noted that, in this embodiment of the present invention, the obtaining unit 501 and the first sending unit 502 are necessary units, while the second sending unit 503 may be an optional unit. It may be understood that, the first sending unit 502 and the second sending unit 503 are in two cases that cannot exist simultaneously. Therefore, in a possible embodiment, the obtaining unit 501 and the second sending unit 503 may be necessary units, while the first sending unit 502 is an optional unit.

It should be noted that, each functional unit in the base station 5 described in this embodiment of the present invention is configured to perform a related step in the embodiment in FIG. 2. For a related description, refer to a specific description in the method embodiment shown in FIG. 2. Details are not described herein again.

In this embodiment, the base station 5 is presented in a form of a functional unit. The "unit" herein may be an application-specific integrated circuit (application-specific integrated circuit, ASIC), a circuit, a processor and a memory that execute one or more software or firmware programs, an integrated logic circuit, and/or another device that can provide the foregoing functions. In a simple embodiment, persons skilled in the art may figure out that the base station 5 may be in a form shown in FIG. 4. The obtaining unit 501, the first sending unit 502, and the second sending unit 503 may be implemented by using the processor and the memory in FIG. 4.

This embodiment of the present invention further provides a computer storage medium, configured to store a computer software instruction used by the base station 5 shown in FIG. 5. The computer software instruction includes a program that is used to execute the foregoing aspects and that is designed for the base station 5.

Figure 6:
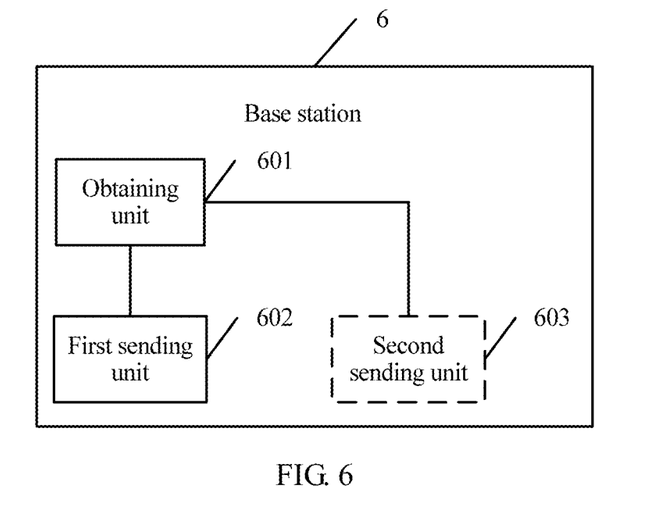
FIG. 6 is a schematic structural diagram of another base station according to an embodiment of the present invention.

Referring to FIG. 6, FIG. 6 is a schematic structural diagram of another base station according to an embodiment of the present invention. As shown in FIG. 6, the base station 6 in this embodiment of the present invention may include an obtaining unit 601 and a first sending unit 602. Optionally, the base station 6 may further include a second sending unit 603.

The obtaining unit 601 is configured to: if a user terminal has a connection whose quality of service class identifier QCI is 1, a total quantity of voice over Long Term Evolution VoLTE data packets of the user terminal that are received by a Packet Data Convergence Protocol PDCP layer of the base station is greater than a first threshold, and a packet error rate of the VoLTE data packets of the user terminal that are received by the PDCP layer of the base station is greater than a second threshold in a detection period, obtain a signal to interference plus noise ratio SINR of the user terminal, a modulation and coding scheme MCS of the user terminal, a packet error rate of a VoLTE data packet that is of the user terminal and that is received by a Media Access Control MAC layer of the base station, and a total quantity of VoLTE data packets of the user terminal that are received by a Radio Link Control RLC layer of the base station in the detection period.

The first sending unit 602 is configured to send an intra-cell handover command to the user terminal if the SINR is greater than a first preset value, the MCS is greater than a second preset value, the packet error rate of the VoLTE data packet that is of the user terminal and that is received by the MAC layer of the base station is less than a third preset value, and the total quantity of VoLTE data packets of the user terminal that are received by the RLC layer of the base station is greater than a fourth preset value.

In a possible embodiment, the base station 6 may further include the second sending unit 603, and the second sending unit 603 is configured to send a radio resource control RRC connection release command to the user terminal if the SINR is less than the first preset value, the MCS is less than the second preset value, the packet error rate of the VoLTE data packet that is of the user terminal and that is received by the MAC layer of the base station is greater than the third preset value, or the total quantity of VoLTE data packets of the user terminal that are received by the RLC layer of the base station is less than the fourth preset value.

In a possible embodiment, when robust header compression ROHC is used, a step of obtaining, by the obtaining unit 601, the packet error rate of the VoLTE data packets of the user terminal that are received by the PDCP layer of the base station includes: if a version number included in the VoLTE data packets of the user terminal that are received by the PDCP layer of the base station is neither IPv4 nor IPv6, adding 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

In a possible embodiment, when ROHC is not used, a step of obtaining, by the obtaining unit 601, the packet error rate of the VoLTE data packets of the user terminal that are received by the PDCP layer of the base station includes: if there is a cyclic redundancy check CRC error in the VoLTE data packets of the user terminal that are received by the PDCP layer of the base station, adding 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

It should be noted that, in this embodiment of the present invention, the obtaining unit 601 and the first sending unit 602 are necessary units, while the second sending unit 603 may be an optional unit. It may be understood that, the first sending unit 602 and the second sending unit 603 are in two cases that cannot exist simultaneously. Therefore, in a possible embodiment, the obtaining unit 601 and the second sending unit 603 may be necessary units, while the first sending unit 602 is an optional unit.

It should be noted that, each functional unit in the base station 6 described in this embodiment of the present invention is configured to perform a related step in the embodiment in FIG. 3. For a related description, refer to a specific description in the method embodiment shown in FIG. 3. Details are not described herein again.

In this embodiment, the base station 6 is presented in a form of a functional unit. The "unit" herein may be an application-specific integrated circuit (application-specific integrated circuit, ASIC), a circuit, a processor and a memory that execute one or more software or firmware programs, an integrated logic circuit, and/or another device that can provide the foregoing functions. In a simple embodiment, persons skilled in the art may figure out that the base station 6 may be in a form shown in FIG. 4. The obtaining unit 601, the first sending unit 602, and the second sending unit 603 may be implemented by using the processor and the memory in FIG. 4.

This embodiment of the present invention further provides a computer storage medium, configured to store a computer software instruction used by the base station 6 shown in FIG. 6. The computer software instruction includes a program that is used to execute the foregoing aspects and that is designed for the base station 6.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a base station, and may specifically be a processor in a computer device) to perform all or some of the steps of the foregoing methods described in the embodiments of the present invention. The foregoing storage medium may include: any medium that can store program code, such as a USB flash drive, a removable hard disk, a magnetic disk, or an optical disc, a ROM, or a RAM.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:
1. A voice service processing method, comprising:
in response to a user terminal having a connection whose quality of service class identifier (QCI) is 1, and a total quantity of voice over Long Term Evolution (VoLTE) data packets of the user terminal that are received by a Packet Data Convergence Protocol (PDCP) layer of a base station that is less than a first threshold in a detection period, identifying a potential issue of one-way audio, and obtaining, by the base station, a signal to interference plus noise ratio (SINR) of the user terminal, a modulation and coding scheme (MCS) of the user terminal, a packet error rate of a VoLTE data packet that is of the user terminal and that is received by a Media Access Control (MAC) layer of the base station, and a total quantity of VoLTE data packets of the user terminal that are received by a Radio Link Control (RLC) layer of the base station in the detection period; and sending, by the base station, an intra-cell handover command to the user terminal to instruct the user terminal to reconfigure a radio bearer in an attempt to resolve the potential issue of one-way audio in response to the SINR being greater than a first preset value, the MCS being greater than a second preset value, the packet error rate of the VoLTE data packet that is of the user terminal and that is received by the MAC layer of the base station being less than a third preset value, and the total quantity of VoLTE data packets of the user terminal that are received by the RLC layer of the base station being greater than a fourth preset value.

2. The method according to claim 1, wherein the method further comprises:

sending, by the base station, a radio resource control (RRC) connection release command to the user terminal in response to the SINR being less than the first preset value, the MCS being less than the second preset value, the packet error rate of the VoLTE data packet that is of the user terminal and that is received by the MAC layer of the base station being greater than the third preset value, or the total quantity of VoLTE data packets of the user terminal that are received by the RLC layer of the base station being less than the fourth preset value.

3. A voice service processing method, comprising:

in response to a user terminal having a connection whose quality of service class identifier (QCI) is 1, a total quantity of voice over Long Term Evolution (VoLTE) data packets of the user terminal that are received by a Packet Data Convergence Protocol (PDCP) layer of the base station that is greater than a first threshold, and a packet error rate of the VoLTE data packets of the user terminal that are received by the PDCP layer of the base station that is greater than a second threshold in a detection period, identifying a potential issue of one-way audio, and obtaining, by the base station, a signal to interference plus noise ratio (SINR) of the user terminal, a modulation and coding scheme MCS of the user terminal, a packet error rate of a VoLTE data packet that is of the user terminal and that is received by a Media Access Control (MAC) layer of the base station, and a total quantity of VoLTE data packets of the user terminal that are received by a Radio Link Control (RLC) layer of the base station in the detection period; and sending, by the base station, an intra-cell handover command to the user terminal to instruct the user terminal to reconfigure a radio bearer in an attempt to resolve the potential issue of one-way audio in response to the SINR being greater than a first preset value, the MCS being greater than a second preset value, the packet error rate of the VoLTE data packet that is of the user terminal and that is received by the MAC layer of the base station being less than a third preset value, and the total quantity of VoLTE data packets of the user terminal that are received by the RLC layer of the base station being greater than a fourth preset value.

4. The method according to claim 3, wherein the method further comprises:

sending, by the base station, a radio resource control (RRC) connection release command to the user terminal in response to the SINR being less than the first preset value, the MCS being less than the second preset value, the packet error rate of the VoLTE data packet that is of the user terminal and that is received by the MAC layer of the base station being greater than the third preset value, or the total quantity of VoLTE data packets of the user terminal that are received by the RLC layer of the base station being less than the fourth preset value.

5. The method according to claim 3, wherein when robust header compression (ROHC) is used, a step of obtaining the packet error rate of the VoLTE data packets of the user terminal that are received by the PDCP layer of the base station comprises:

in response to a version number comprised in the VoLTE data packets of the user terminal that are received by the PDCP layer of the base station being neither IPv4 nor IPv6, adding, by the base station, 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

6. The method according to claim 3, wherein when robust header compression (ROHC) is not used, a step of obtaining the packet error rate of the VoLTE data packets of the user terminal that are received by the PDCP layer of the base station comprises:

in response to there being a cyclic redundancy check (CRC) error in the VoLTE data packets of the user terminal that are received by the PDCP layer of the base station, adding, by the base station, 1 to a quantity of error packets in the VoLTE data packets of the user terminal that are received by the PDCP layer, and calculating, based on the total quantity of VoLTE voice packets of the user terminal that are received by the PDCP layer and the quantity of error packets, the packet error rate of the VoLTE data packets of the user terminal that are received by the PDCP layer of the base station.

7. A base station, comprising:

an obtaining unit, configured to: in response to a user terminal having a connection whose quality of service class identifier QCI is 1, and a total quantity of voice over Long Term Evolution (VoLTE) data packets of the user terminal that are received by a Packet Data Convergence Protocol (PDCP) layer of the base station being less than a first threshold in a detection period, identify a potential issue of one-way audio, and obtain a signal to interference plus noise ratio (SINR) of the user terminal, a modulation and coding scheme (MCS) of the user terminal, a packet error rate of a VoLTE data packet that is of the user terminal and that is received by a Media Access Control (MAC) layer of the base station, and a total quantity of VoLTE data packets of the user terminal that are received by a Radio Link Control (RLC) layer of the base station in the detection period; and a first sending unit, configured to send an intra-cell handover command to the user terminal to instruct the user terminal to reconfigure a radio bearer in an attempt to resolve the potential issue of one-way audio in response to the SINR being greater than a first preset value, the MCS being greater than a second preset value, the packet error rate of the VoLTE data packet that is of the user terminal and that is received by the MAC layer of the base station being less than a third preset value, and the total quantity of VoLTE data packets of the user terminal that are received by the RLC layer of the base station being greater than a fourth preset value.

8. The base station according to claim 7, wherein the base station further comprises:
a second sending unit, configured to send a radio resource control (RRC connection release command to the user terminal in response to the SINR being less than the first preset value, the MCS being less than the second preset value, the packet error rate of the VoLTE data packet that is of the user terminal and that is received by the MAC layer of the base station being greater than the third preset value, or the total quantity of VoLTE data packets of the user terminal that are received by the RLC layer of the base station being less than the fourth preset value.

9. A base station, wherein the base station comprises a processor and a transceiver, wherein
the processor is configured to: in response to a user terminal having a connection whose quality of service class identifier (QCI) is 1, and a total quantity of voice over Long Term Evolution (VoLTE) data packets of the user terminal that are received by a Packet Data Convergence Protocol (PDCP) layer of the base station being less than a first threshold in a detection period, identify a potential issue of one-way audio, and obtain a signal to interference plus noise ratio (SINR) of the user terminal, a modulation and coding scheme (MCS) of the user terminal, a packet error rate of a VoLTE data packet that is of the user terminal and that is received by a Media Access Control (MAC) layer of the base station, and a total quantity of VoLTE data packets of the user terminal that are received by a Radio Link Control (RLC) layer of the base station in the detection period; and
the processor is further configured to send an intra-cell handover command to the user terminal using the transceiver to instruct the user terminal to reconfigure a radio bearer in an attempt to resolve the potential issue of one-way audio in response the SINR being greater than a first preset value, the MCS being greater than a second preset value, the packet error rate of the VoLTE data packet that is of the user terminal and that is received by the MAC layer of the base station being less than a third preset value, and the total quantity of VoLTE data packets of the user terminal that are received by the RLC layer of the base station being greater than a fourth preset value.

* * * * *